United States Patent [19]

Struk et al.

[11] 3,836,789

[45] Sept. 17, 1974

[54] TRANSISTOR-TRANSISTOR LOGIC CIRCUITRY AND BIAS CIRCUIT

[75] Inventors: James R. Struk, Wappingers Falls; Robert G. Werner, Poughkeepsie, both of N.Y.

[73] Assignee: International Business Machines Corporation, Armonk, N.Y.

[22] Filed: June 22, 1973

[21] Appl. No.: 372,891

[52] U.S. Cl. .................. 307/203, 307/215, 307/218, 307/299 A, 307/317 A

[51] Int. Cl. .......................................... H03k 19/08

[58] Field of Search ........ 307/203, 215, 218, 299 A, 307/317 A

[56] References Cited

UNITED STATES PATENTS

| | | | |
|---|---|---|---|
| 3,509,362 | 4/1970 | Bartholomew | 307/203 |
| 3,555,294 | 1/1971 | Treadway | 307/203 |
| 3,629,609 | 12/1971 | Pederson et al. | 307/299 A |
| 3,676,713 | 7/1972 | Wiedmann | 307/215 |
| 3,679,917 | 7/1972 | Bryant et al. | 307/297 |
| 3,699,362 | 10/1972 | Jordan | 307/299 A |
| 3,703,651 | 11/1972 | Blowers | 307/297 |
| 3,710,041 | 1/1973 | Hayashi et al. | 307/317 |

OTHER PUBLICATIONS

"CKT with Negative FDBK" by Wu in IBM Tech. Disc. Bulletin, Vol. 13, No. 2, July 1970, page 435.

"Bilevel Powered Driver" by Geller et al. in IBM Tech. Disc. Bulletin, Vol. 13, No. 6, Nov. 1970, page 1726.

"Nonsaturating TTL Gate" by Davidson in IBM Tech. Disc. Bulletin, Vol. 13, No. 9, Feb. 1971, page 2657.

*Primary Examiner*—Stanley D. Miller, Jr.
*Attorney, Agent, or Firm*—Kenneth R. Stevens; Wesley DeBruin

[57] ABSTRACT

An improved modified transistor-transistor logic ($T^2L$) circuit having operating voltage compatible with existing $T^2L$ logic blocks which includes a coupling transistor having its base connected to a current source and being selectively responsive to switch current either between its respective base emitter terminals or base collector terminals, and an output transistor having its base connected to the collector of the coupling transistor for generating an output signal at its collector terminal, and an on diode connected to the emitter of the output transistor for providing a current path constituted by the base-to-collector terminals of the coupling transistor, the base-to-emitter terminals of the output transistor, and the on diode. The modified $T^2L$ circuit is also compatible with a lower power supply voltage source.

6 Claims, 4 Drawing Figures

AND - INVERT

TRANSISTOR-TRANSISTOR LOGIC CIRCUITRY AND BIAS CIRCUIT

BACKGROUND OF THE INVENTION

This invention relates to a logic circuit and more particularly to an improved modified transistor-transistor logic ($T^2L$) circuit.

BRIEF DESCRIPTION OF PRIOR ART

The logic circuit in FIG. 4 essentially represents a basic $T^2L$ logic block commonly used in the prior art. The input terminals such as A or B are normally driven by a coupling transistor collector terminal, as for example, represented by terminal 68 in FIG. 2. This type of basic $T^2L$ logic block normally operates on a supply voltage of approximately 5.0 volts and generates an up level output voltage of approximately 3.4 volts, and a down level of approximately 0.4 volts, as represented by the output terminal $\overline{A+B}$.

In large scale integration it is always desirous to reduce the size of the basic logic blocks as well as the power dissipation, which obviously allow an increased number of logic circuits to be fabricated on a single semiconductor substrate. In accordance with these objectives modified $T^2L$ circuits have been designed. However, in order to communicate between basic or conventional $T^2L$ circuits as previously discussed with reference to FIG. 4 and the modified $T^2L$ circuits, it has been generally necessary to provide voltage translating circuits between the conventional $T^2L$ logic blocks or circuits and the modified $T^2L$ logic circuits in order to render their respective operating voltages mutually compatible.

SUMMARY OF THE INVENTION

It is therefore an object of the present invention to provide a modified $T^2L$ circuit having reduced power dissipation and component requirements which is directly compatible without voltage translating circuits with conventional $T^2L$ logic blocks of the prior art.

Another object of the present invention is to provide a modified $T^2L$ circuit which requires lesser number of components and lower power requirements than conventional $T^2L$ circuit logic blocks.

Another object of the present invention is to provide an improved modified $T^2L$ basic logic block which operates with reduced values of load resistors, which requires a reduced number of elements, so as to significantly increase circuit density in monolithic form while increasing operating speeds.

Another object of the present invention is to provide an improved modified $T^2L$ logic block while maintaining optimum threshold switching levels.

Another object of the present invention is to provide a basic improved modified $T^2L$ logic circuit which operates in conjunction with a reduced power supply voltage and wherein the modified $T^2L$ circuits track with the internal power supply circuit.

SUMMARY OF THE INVENTION

The present invention provides an improved modified $T^2L$ circuit having operating voltages compatible with existing $T^2L$ logic blocks and includes a coupling transistor having its base connected to a current source and which is selectively responsive to switch current either between its respective base emitter terminals or base collector terminals, and an output transistor having its base connected to the collector of the coupling transistor for generating an output signal at its collector terminal, and an on diode connected to the emitter of the output transistor for providing a current path constituted by the base-to-collector terminals of the coupling transistor, the base-to-emitter terminals of the output transistor, and the on diode. The modified $T^2L$ circuit is also compatible with a lower power supply driving voltage source.

DESCRIPTION OF THE PREFERRED EMBODIMENTS

Figure 1:
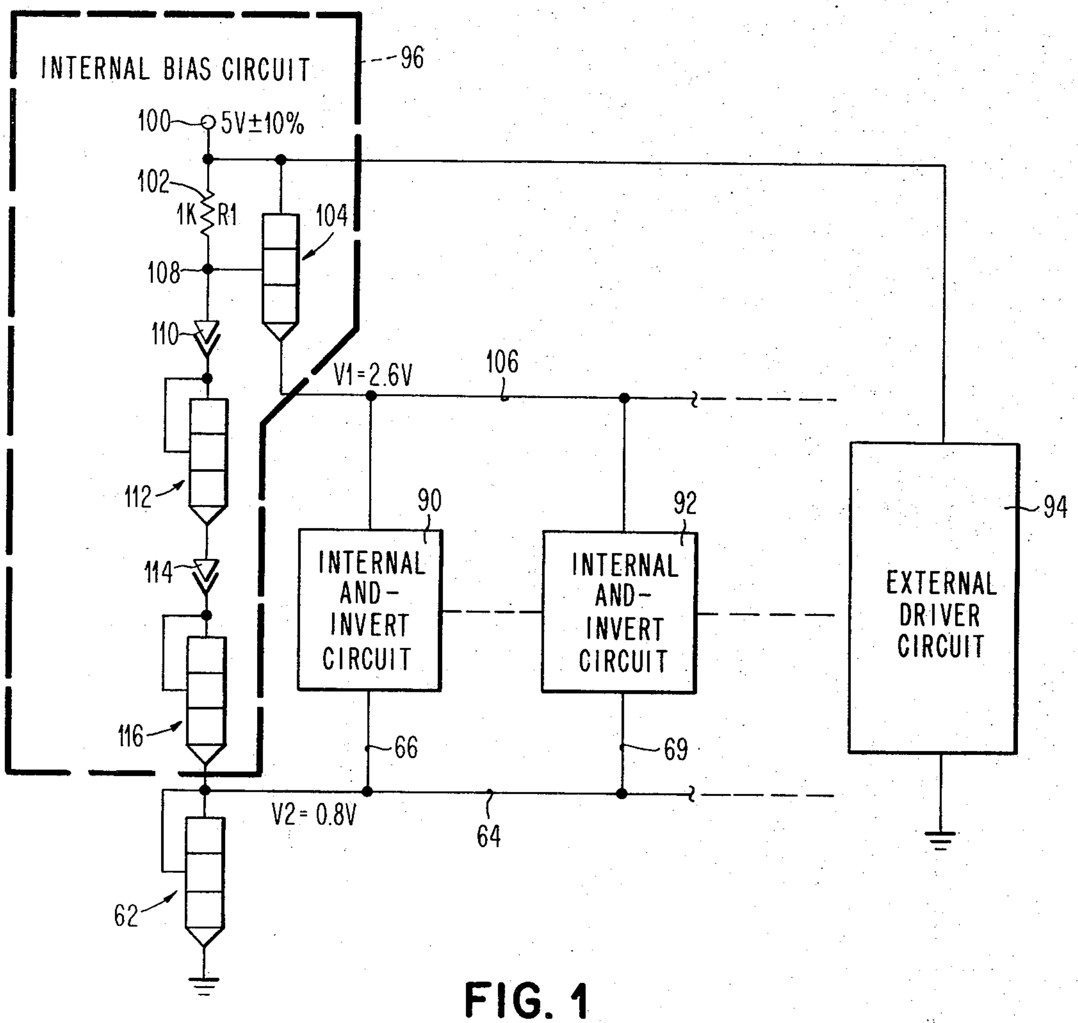
FIG. 1 is a schematic diagram depicting the improved internal bias circuit in combination with the improved modified $T^2L$ logic circuit of the present invention, represented by the block diagrams Internal And-Invert Circuits in combination with conventional or prior art $T^2L$ logic blocks represented by the block diagram External Driver Circuit.

The present invention is described with reference to FIG. 4 by the manner in which the prior art basic $T^2L$ logic block is varied. With either of the input transistors 10 or 12 in a conducting state, the base of pull-down transistor 14 is in a relatively negative state with respect to output terminal 16 which in turn is connected to the emitter of transistor 14 via diode 18. Accordingly, transistor 14 is in an off or non-conducting condition. Also, with either transistor 10 or 12 conducting its emitter terminal raises the base terminal of output transistor 26 to a forward biased condition with respect to the emitter terminal of output transistor 26, and thus transistor 26 is in a conductive or on state. Thus, current flows from the output terminal 16 in the direction indicated by current I1 down through transistor 26 to ground potential. With transistor 26 in a conductive state, the output terminal 16 reaches a steady state output voltage condition of approximately 0.4 volts. However, with both input transistors 10 and 12 in a nonconductive condition by virtue of relatively negative input signals A and B being applied to their respective base terminals, both transistors are in a nonconducting state. As a result, node 36 is relatively positive and thus renders pull-down transistor 14 to an on or conductive state. Accordingly, current I2 flows from the supply terminal 37 of 5.0 volts to the output terminal 16 via transistor 14. Under these circumstances the output terminal 16 rises to approximately 3.4 volts. In a conventional manner, resistor 40 provides a load impedance for transistor 14, and the Schottky Barrier diode 42 in combination with resistor 44 provide an emitter impedance for transistors 10 and 12 when they are in a conductive state.

Finally, Schottky Barrier diodes 48, 49 and 52 are connected across the base collector terminals of transistors 10, 12, and 26 to prevent saturation of their associated transistors in a well known manner.

Figure 2:
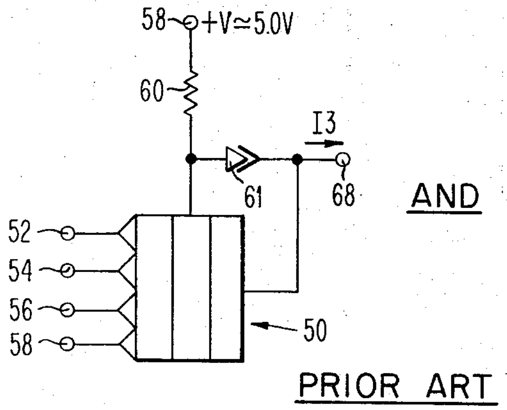
FIGS. 2 and 4 taken together essentially represent prior art $T^2L$ logic blocks of the prior art.
Figure 4:
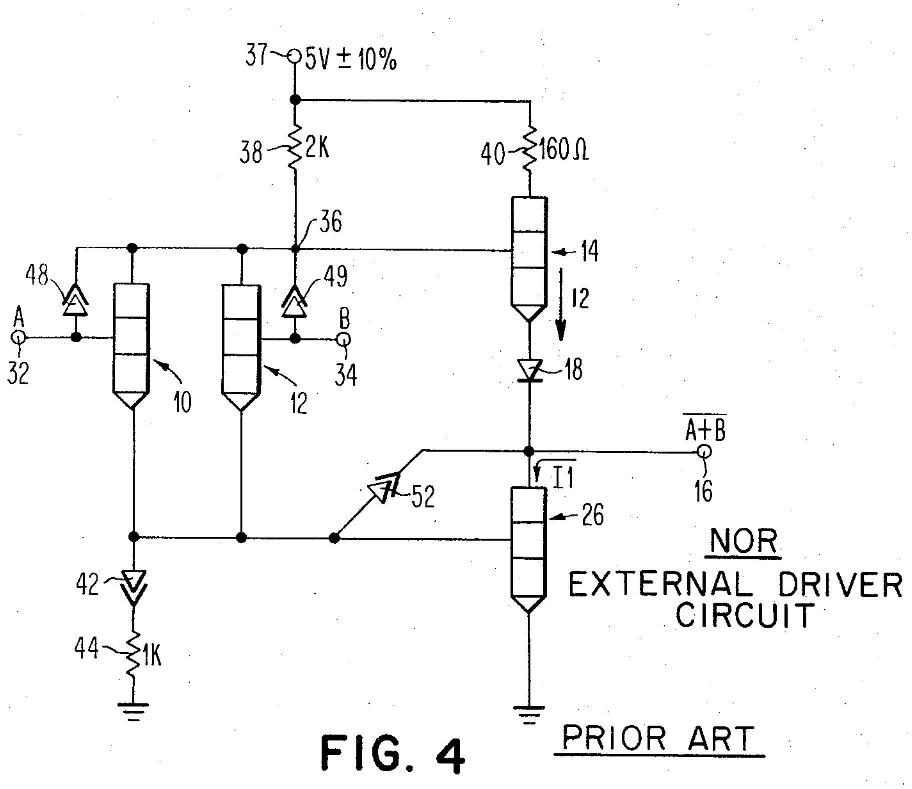
FIG. 4 PRIOR ART

The circuit of FIG. 4 in a $T^2L$ mode of operation is normally driven by a coupling transistor as represented in FIG. 2 which comprises a multiemitter transistor 50, having a plurality of emitter terminals depicted at 52, 54, 56, and 58. The basic coupling transistor 50 is connected to a supply voltage at terminal 58 which connects to the base terminal by means of load resistor 60. A Schottky Barrier diode 61 is connected across its base collector diode and prevents saturation of the coupling transistor 50. With all of the input terminals of coupling transistor 50 in an up level it can be seen that current I3 is generated through a current path constituting voltage supply terminal 58, resistor 60 and the output terminal 68. This state corresponds to a relatively up level being generated at output terminal 68. From this analysis it can be seen that the primary function of transistors 10 or 12 and 26 (FIG. 4) is to provide an on equivalent diode voltage drop for current I3, the diode drop being constituted by the base to emitter drop of transistors 10 or 12 and 26.

Figure 3:
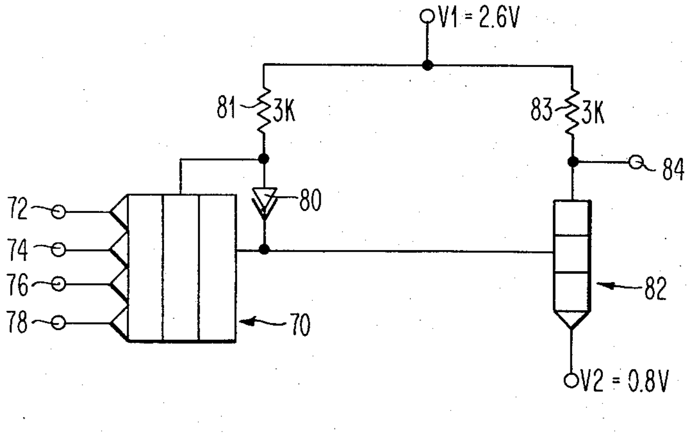
FIG. 3 is a schematic diagram illustrating an And-Invert logic block which constitutes the improved modified $T^2L$ circuit of the present invention, and is illustrated in block diagram in FIG. 1 as the Internal And-Invert Circuit.

In the improved circuit of the present invention the transistors 10 or 12 and 26 are replaced by transistor 82 of FIG. 3 and a diode which is maintained in an on state for all conditions. This on diode is illustrated in FIG. 1 as diode 62 connected to line 64. Line 64 in turn connects by means of interconnections 66, 69, etc. to the internal or basic modified logic circuit as represented in FIG. 3. The basic improved $T^2L$ circuit as shown in FIG. 3 comprises an input coupling transistor 70 having a plurality of emitter input lines 72, 74, 76, ane 78. A Schottky Barrier anti-saturation diode 80 is connected across its base-to-collector terminals. A supply voltage V1 of about 2.6 volts is connected to the base of coupling transistor 70 via resistor 81 and to the collector of output transistor 82 via load resistor 83. The output terminal of the improved $T^2L$ logic circuit is constituted by terminal 84 connected to the collector of transistor 82 and the emitter of transistor 82 is connected to a voltage supply V2 which in the preferred embodiment is approximately 0.8 volts. Accordingly, the improved and modified $T^2L$ basic logic block of FIG. 3 in combination with the on diode 62 basically replaces the circuitry as represented by the circuits shown in FIGS. 2 and 4.

Now referring to FIG. 1, it can be seen that the basic logic internal AND invert circuit represented in FIG. 3 is readily incorporated into the overall circuit arrangement illustrated in FIG. 1. Each of the improved circuits described in FIG. 3 are schematically illustrated as Internal And-Invert Circuits 90, 92, etc. The external driver circuit 94 schematically shown in block diagram essentially represents prior art conventional $T^2L$ basic logic blocks as in FIG. 4, but which readily communicate with the improved modified $T^2L$ logic block of the present invention. Both the improved $T^2L$ logic blocks 90, 92, etc. of the present invention and the prior conventional $T^2L$ logic blocks 94 are advantageously driven by an internal bias circuit or supply source 96. As depicted in the present invention the internal bias driver 96 provides two functions. One function is to provide the reduced voltage for driving the internal and external driver circuits, namely V1–V2, and also to continuously maintain diode 62 in a conductive state.

The bias driver 96 is supplied from a positive voltage supply at terminal 100, which in the preferred embodiment is approximately 5.0 volts. The power supply voltage is supplied to the internal and external circuits by means of a resistor 102 which in turn is connected to the base of transistor 104. The emitter of transistor 104 connects to common line 106 so as to supply the Internal and External circuits with a reduced supply V1 equal to approximately 2.6 volts. The base terminal 108 of transistor 104 is in turn serially connected to Schottky Barrier diode 110, junction diode 112, Schottky Barrier diode 114, junction diode 116, and finally common line 64 for supplying the other side of the logic circuits with voltage V2 equal to approximately 0.8 volts. The internal bias driver circuit function to provide an overall operating voltage of approximately 1.8 volts to the $T^2L$ circuits, i.e., V1–V2= approximately 1.8 volts.

From the previous description of FIGS. 2 and 4 of the prior art it can be seen that one of the primary functions of transistor 26 is to provide an on diode drop, that is a base to emitter drop, when either of the input transistors 10 or 12 is in a conductive state. In the opposite state transistor 26 is nonconducting and output transistor 14 is conducting.

The Schottky Barrier diode 80 prevents saturation and the accompanying inverse beta problems associated with coupling transistor 70, and the on diode 62 maintains the desired threshold level of the modified $T^2L$ circuit to a level compatible with prior art circuits.

In the prior art circuits a single voltage supply of approximately 5.0 volts is employed to power a $T^2L$ circuit and thus a relatively large load resistor of approximately 10K ohms was required for the resistors shown at 81 and 82 in FIG. 3. Of course, with the larger resistor values the overall delay (RC) of the circuit is increased. In order to maintain the improved modified $T^2L$ logic circuit compatible with the speeds of prior art $T^2L$ circuits it is necessary to overcome this problem. Accordingly, a reduced bias driver circuit is optimally employed with the improved internal circuits of the present invention. This reduced power supply allows the load resistors 81 and 83 to be dropped from a previously required value of approximately 10K to approximately 3K in the preferred embodiment. Accordingly, each of the internal modified $T^2L$ circuits of the present invention represented by block diagrams 90, 92, etc., in the present invention are driven from a bias driver circuit or supply 96 which generates approximately V1–V2, or 1.8 volts to the logic circuits. Again, this absolute voltage level is not only compatible with the modified circuit of FIG. 3 of the present invention but is also compatible with the threshold voltage of the external driver circuits, represented by block diagram 94 of FIG. 1. It is to be further noted that due to the voltage divider effect between resistor 102 and the remaining series low dynamic impedance constituted by Schottky Barrier diode 110, junction diode 112, Schottky Barrier diode 114, junction diode 116, and the on diode 62, the overall voltage variation tolerances are improved in contrast to that which would be obtainable by connecting a direct supply to line 106.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A monolithic chip of semiconductor material having a bias circuit, a plurality of logic circuits, and a logic circuit including driver circuit means respectively contained thereon:

said bias circuit comprising, a first terminal having an electrical potential of a magnitude $V_1$ impressed thereon, a second terminal having an electrical potential of a magnitude $V_4$ impressed thereon, first transistor circuit means connected between said first and second terminals, said first transistor circuit means providing at a third terminal an electrical potential having a magnitude of $V_2$, said first transistor circuit means providing at a fourth terminal an electrical potential having a magnitude of $V_3$, and where the magnitudes of $V_1$, $V_2$, $V_3$ and $V_4$ have the following relationship $V_1>V_2>V_3>V_4$;

each of said plurality of logic circuits comprising, a first transistor including a collector, a base and a plurality of emitters, each of said plurality of emitters of said first transistor being adapted to receive a logical input signal, a second transistor including a collector, a base and an emitter, a first resistor connected between said base of said first transistor and said third terminal of said bias circuit, a second resistor connected between said collector of said second transistor and said third terminal of said bias circuit, a direct connection between said collector of said first transistor and said base of said second transistor, said emitter of said second transistor being directly connected to said fourth terminal of said bias circuit, and an output terminal connected to said collector of said second transistor;

said logic circuit including driver circuit means comprising, second transistor circuit means having a plurality of inputs and an output, said second transistor circuit means being connected to said first and second terminals of said bias circuit;

and means interconnecting at least certain of said output terminals of said plurality of logic circuits with said plurality of inputs of said logic circuit including driver circuit means, whereby each of said plurality of logic circuits on said chip is subjected to a supply potential having a magnitude of $V_2$–$V_3$, said logic circuit including driver circuit means is subjected to a supply potential having a magnitude of $V_1$–$V_4$, and the logic signals on said chip are compatible in magnitude.

2. A monolithic chip of semiconductor material having a bias circuit, plurality of logic circuits and a logic circuit including driver circuit means respectively contained thereon, as recited in claim 1, and wherein said first transistors circuit means of said bias circuit comprises;

a third transistor having a base, collector and emitter, said collector of said third transistor being connected to said first terminal of said bias circuit, a third resistor connecting said base of said third resistor to said collector of said third resistor, said third terminal of said bias circuit being directly connected to said emitter of said third transistor, a fourth transistor having a base, collector and emitter, a direct connection between said base and collector of said fourth transistor, a first Schottky Barrier Diode connected between said base of said third transistor and said collector of said fourth transistor, a fifth transistor having a base, collector and emitter, a direct connection between said base, and collector of said fifth transistor, a second Schottky Barrier Diode connected between said emitter of said fourth transistor and said collector of said fifth transistor, a sixth transistor having a base collector and emitter, a direct connection between said base and said collector of said sixth transistor, a direct common connection between said collector of said sixth transistor, said emitter of said fifth transistor and said fourth terminal of said bias circuit, and said emitter of said sixth transistor being directly connected to said second terminal of said bias circuit.

3. A monolithic chip of semiconductor material having a bias circuit, a plurality of logic circuits, and a logic circuit including driver means respectively contained thereon, as recited in claim 1, and wherein said second transistor circuit means of said logic circuit means including driver circuit means comprises:

a seventh transistor having a collector, a base and a plurality of emitters respectively connected to a portion of said inputs of said logic circuit including driver circuit means, a fourth resistor connecting said base of said seventh transistor to said first terminal of said bias circuit, an eighth transistor having a collector base and a plurality of emitters respectively connected to the remaining portion of said inputs of said logic circuit including driver circuit means, a fifth resistor connecting said base of said eighth transistor to said first terminal of said bias circuit, a ninth transistor having a base, a collector and an emitter, a direct connection between said collector of said seventh transistor and said base of said ninth transistor, a tenth transistor having a base, a collector and an emitter, a direct connection between said collector of said eighth transistor and said base of said tenth transistor, a sixth resistor connected between said collectors of said ninth and tenth transistors and said first terminal of said bias circuit, an eleventh transistor having a base, a collector and an emitter, a seventh resistor connecting said collector of said eleventh transistor to said first terminal of said bias circuit, a direct connection between said base of said eleventh transistor and said collectors of said ninth and tenth transistors, a twelfth transistor having a collector, base and emitter, a diode connected between said emitter of said eleventh transistor and said collector of said twelfth transistor, said emitter of said twelfth transistor being connected to said second terminal of said bias circuit, an eighth resistor and a third Schottky Barrier Diode serially connected between said second terminal of said bias circuit and said emitters of said ninth and tenth transistors, a direct connection between said emitters of said ninth and tenth transistors and said base of said twelfth transistor, said output of said logic circuit including driver means being connected to said collector of said twelfth transistor.

4. A monolithic chip of semiconductor material having a bias circuit, a plurality of logic circuits and a logic circuit including driver circuit means respectively contained thereon, as recited in claim 3, wherein said potential $V_1$ has a magnitude in the order of 5 volts, said potential $V_2$ has a magnitude in the order of 2.6 volts, said potential $V_3$ has a magnitude in the order of 0.8 volts, and said potential $V_4$ has a magnitude in the order of 0 volts.

5. A circuit device fabricated on a monolithic chip of semiconductor material, said circuit device comprising:

a bias circuit having first, second, third and fourth transistors, said first, second, third and fourth transistors respectively having a collector, a base and an emitter, said bias circuit having first, second, third and fourth terminals, said collector of said first transistor being directly connected to said first terminal, a first resistor connecting said base of said first transistor to said collector of said first transistor, a first Schottky Barrier Diode connected between said base of said first transistor to said collector of said second transistor, a direct connection between said base of said second transistor and said collector of said second transistor, a second Schottky Barrier Diode connected between said emitter of said second transistor and said collector of said third transistor, a direct connection between said base of said third transistor and said collector of said third transistor, a direct connection between said emitter of said third transistor and said collector of said fourth transistor, a direct connection between said base of said fourth transistor and said collector of said fourth transistor, a direct connection between said emitter of said fourth transistor and said fourth terminal of said bias circuit, said second terminal of said bias circuit being directly connected to said emitter of said first transistor, said third terminal of said bias circuit being directly connected to said collector of said fourth transistor, whereby the application of a potential having a magnitude of $V_1$ volts on said first terminal and the application of a potential having a magnitude of $V_4$ volts on said fourth terminal, results in a potential having a magnitude in the order of $V_2$ volts being manifested at said second terminal, and a potential having a magnitude in the order of $V_3$ volts being manifested at said second terminal;

a plurality of logic circuits respectively connected to said second and third terminals of said bias circuit, each of said plurality of logic circuits having a fifth transistor, said fifth transistor having a collector, a base and a plurality of emitters respectively adapted to receive logical input signals, each of said plurality of logic circuits having a sixth transistor, said sixth transistor having a collector, base and emitter, a second resistor connecting said base of said fifth transistor to said second terminal of said bias circuit, a third resistor connecting said collector of said sixth transistor to said second terminal of said bias circuit, a direct connection between said collector of said fifth transistor and said base of said sixth transistor, a direct connection between said emitter of said sixth transistor and said third terminal of said bias circuit, and an output terminal connected to said collector of said sixth transistor;

first connection means connecting at least some of the outputs of said plurality of logic circuits to the input of at least some of said logic circuits;

a driver logic circuit connected to said first and fourth terminals of said bias circuit, said driver logic circuit including seventh, eighth, ninth, tenth, eleventh and twelfth transistors, said seventh and eighth transistor respectively having a collector, a base, and a plurality of emitters respectively adapted to receive logical input signals, said ninth, tenth, eleventh and twelfth transistors respectively have a collector, base and emitter, fourth and fifth resistors respectively connecting said bases of said seventh and eighth transistor to said first terminal of said bias circuit, said collector of said seventh transistor being connected to aid base of said ninth transistor, said collector of said eighth transistor being connected to said base of said tenth transistor, a direct connection between said collector of said ninth transistor, said collector of said tenth transistor and said base of said eleventh transistor, a sixth resistor connecting said collectors of said ninth and tenth transistors and said base of said eleventh transistor to said first terminal of said bias circuit, a seventh resistor connecting said collector of said eleventh transistor to said first terminal of said bias circuit, a third Schottky Barrier Diode and an eighth resistor serially connecting said emitters of said ninth and tenth transistors and said base of said twelfth transistor to said fourth terminal of said bias circuit, said emitter of said twelfth transistor being connected to said fourth terminal of said bias circuit, a diode connected between said emitter of said eleventh transistor and said collector of said twelfth transistor, and an output terminal connected to said collector of said twelfth transistor;

second connection means connecting said inputs of said logic driver circuit means to at least some of the outputs of said plurality of logic circuits, whereby the power supply voltage provided to each of said plurality of logic circuits is lesser in magnitude than the power supply voltage provided to said logic driver circuit and the operating voltages of all the logic circuits contained on said chip are compatible.

6. A circuit device fabricated on a monolithic chip of semiconductor material as claimed in claim 5, wherein said potential $V_1$ has a magnitude in the order of 5 volts, said potential $V_2$ has a magnitude in the order of 2.6 volts, said potential $V_3$ has a magnitude in the order of 0.8 volts, and said potential $V_4$ has a magnitude in the order of 0 volts.

* * * * *